March 10, 1936.  H. T. LAMB, JR  2,033,719
FLUID MEASURING MOTOR
Filed May 31, 1935    2 Sheets-Sheet 1
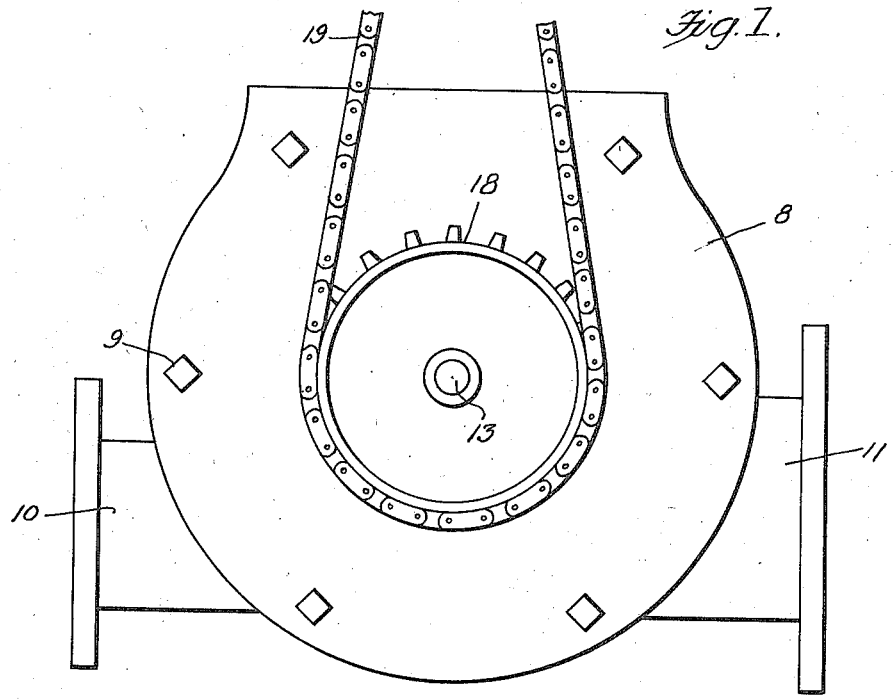
Fig. 1.
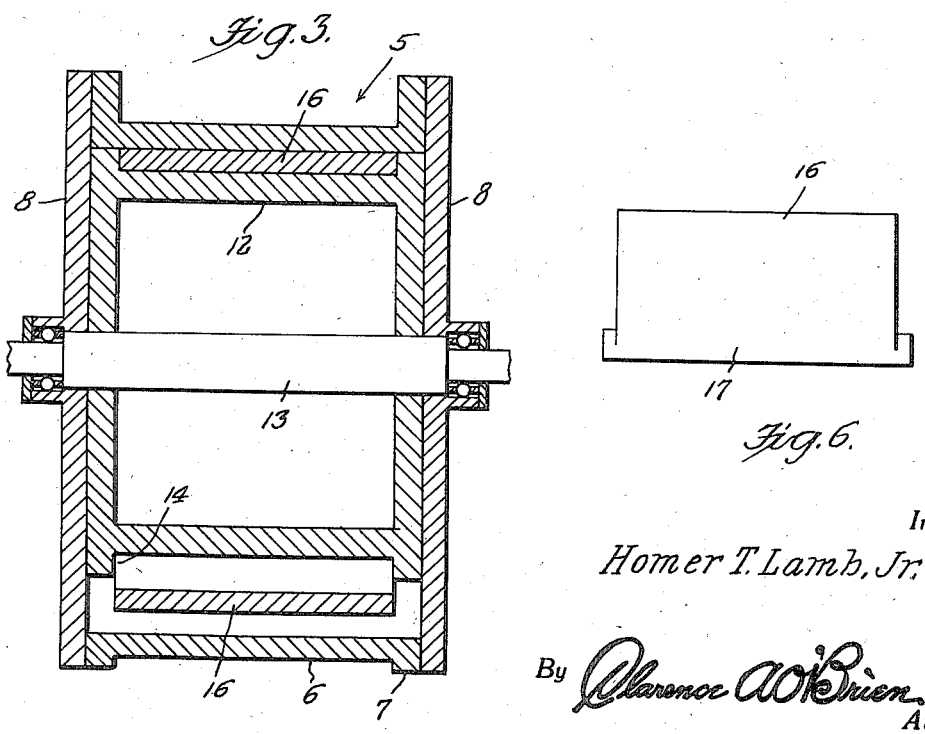
Fig. 3.
Fig. 6.
Inventor
Homer T. Lamb, Jr.
By Clarence A. O'Brien
Attorney March 10, 1936.  H. T. LAMB, JR  2,033,719
FLUID MEASURING MOTOR
Filed May 31, 1935  2 Sheets-Sheet 2

Inventor
Homer T. Lamb, Jr.

By *Clarence A. O'Brien*
Attorney

Patented Mar. 10, 1936

2,033,719

UNITED STATES PATENT OFFICE 2,033,719

FLUID MEASURING MOTOR

Homer T. Lamb, Jr., Tulsa, Okla.

Application May 31, 1935, Serial No. 24,438

1 Claim. (Cl. 103—140)

This invention appertains to new and useful improvements in dispensing apparatus and more particularly to a motor for delivering fluid in measured quantities.

The principal object of the invention is to provide a fluid dispensing device which when in operation will permit fluid in measured quantities to pass in a conduit in which the same is installed.

Another important object of the invention is to provide a device for the purpose of dispensing fluids or substances in fixed proportions to the quantity or volume of the fluids which pass through the measuring motor and provide the impetus of its operation.

Another important object of the invention is to provide a measuring device which will deliver revolutions of its shaft in fixed and exact proportions of quantity for volume of the fluid passing through the device.

Other important objects and advantages of the invention will become apparent to the reader of the following specification.

In the drawings:

Figure 1 represents a side elevational view of the motor.

Figure 3 is a vertical transverse sectional view.

Figure 6 represents an elevational view of one of the panes.

Figure 2:
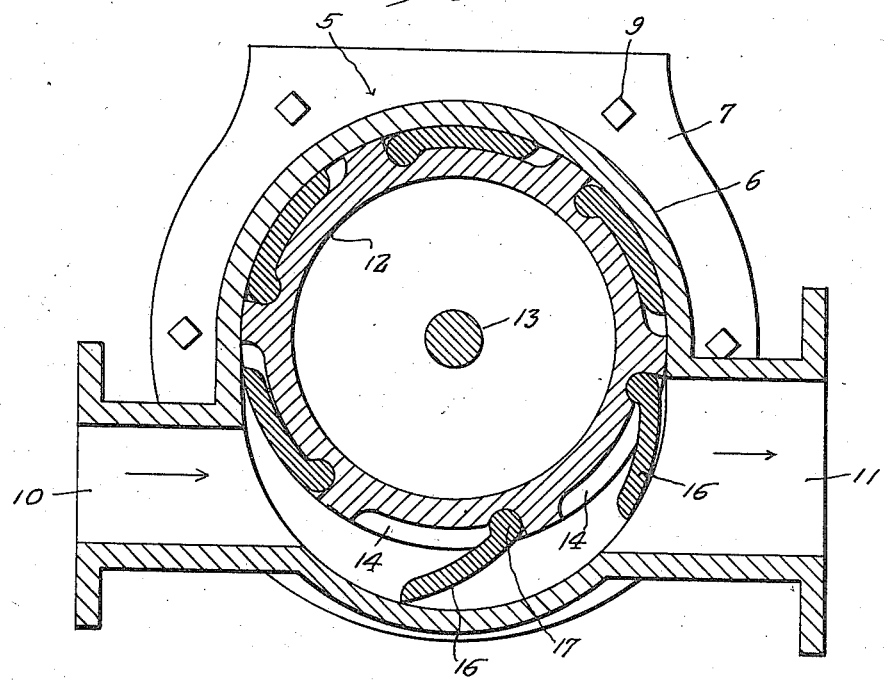
Figure 2 is a vertical longitudinal sectional view through the apparatus.
Figure 4:
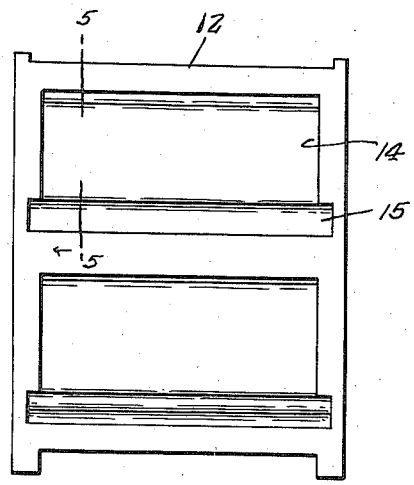
Figure 4 represents a base elevational view of the rotor.
Figure 5:
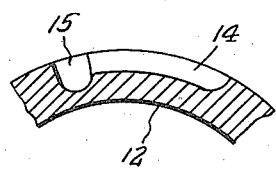
Figure 5 represents a fragmentary circumferential sectional view taken substantially on line 5—5 of Figure 4.

Referring to the drawings wherein like numerals designate like parts, it can be seen that numeral 5 generally refers to the stator which consists of the circular wall 6 provided with outstanding circumferentially extending flanges 7 which are wider at the top of the stator than at the bottom. End plates 8—8 are disposed against the flanged sides of the stator wall 6, to complete the stator and bolt members 9 are disposed through the flanges 7 and the plates 8 to secure these parts together and complete the stator construction. The stator at its lower portion is provided with an inlet 10 and at an opposite point with the larger outlet 11.

It will be observed that the rotor 12 is eccentrically mounted within the ovate-shaped stator 5, in the manner suggested in Figure 2, while 13 represents the shaft which extends transversely through the stator and on this is secured the said rotor 12.

The peripheral portion of the rotor 12 is provided with short circumferentially extending pockets 14 which merge with transversely extending grooveways 15.

Arcuate shaped vanes or plates 16 are constructed for disposition in the pockets 14 and each is provided with a cylindrical shoulder portion at one longitudinal edge denoted by numeral 17 for rest in a corresponding grooveway 15. These vanes are free to gravitate and as is clearly shown in Figure 1, a sprocket wheel 18 on one outer end of the shaft 13 has a drive chain 19, so that when the rotor 12 is driven by this drive means it is rotated counterclockwise, as shown in Figure 2, and as each vane 16 passes over the inlet 10, it begins to gravitate until it reaches the position directly under the shaft 13. From this lowermost position it begins to move back toward the rotor and as it passes over the outlet 11, material between it and the next following vane begins to discharge.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

In a machine of the character described, a rotor provided with a plurality of circumferentially spaced peripheral pockets of shallow depth, vanes swingably mounted in said pockets, said pockets being substantially longer than the vanes with the bottoms of the pockets extending beyond the free ends of the vanes, the free ends of said vanes being beveled in a direction inwardly toward the inner sides of the vanes, said vanes when in contracted position having the major portions of their inner sides engaging with the bottom of the pockets, said vanes being of such thickness as to cause the outer sides thereof to lie flush with the periphery of the rotor when in contracted position.

HOMER T. LAMB, Jr.